Figure 1:
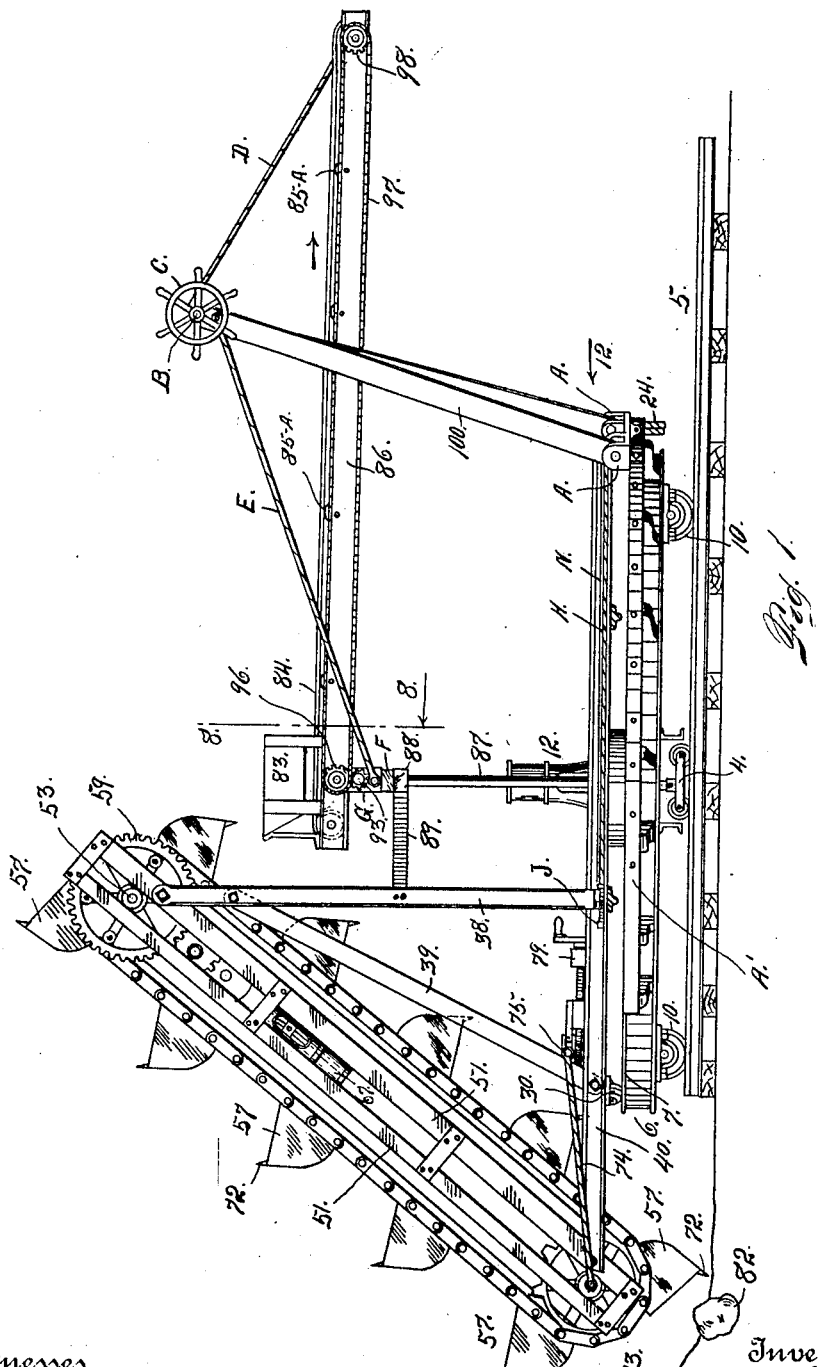

No. 892,829.

PATENTED JULY 7, 1908.

W. M. GROSS.
STEAM SHOVEL.
APPLICATION FILED OCT. 8, 1907.

8 SHEETS—SHEET 3.

Witnesses
Otto E. Hoddick.
Dena Nelson.

Inventor
W. M. Gross.
By
Attorney

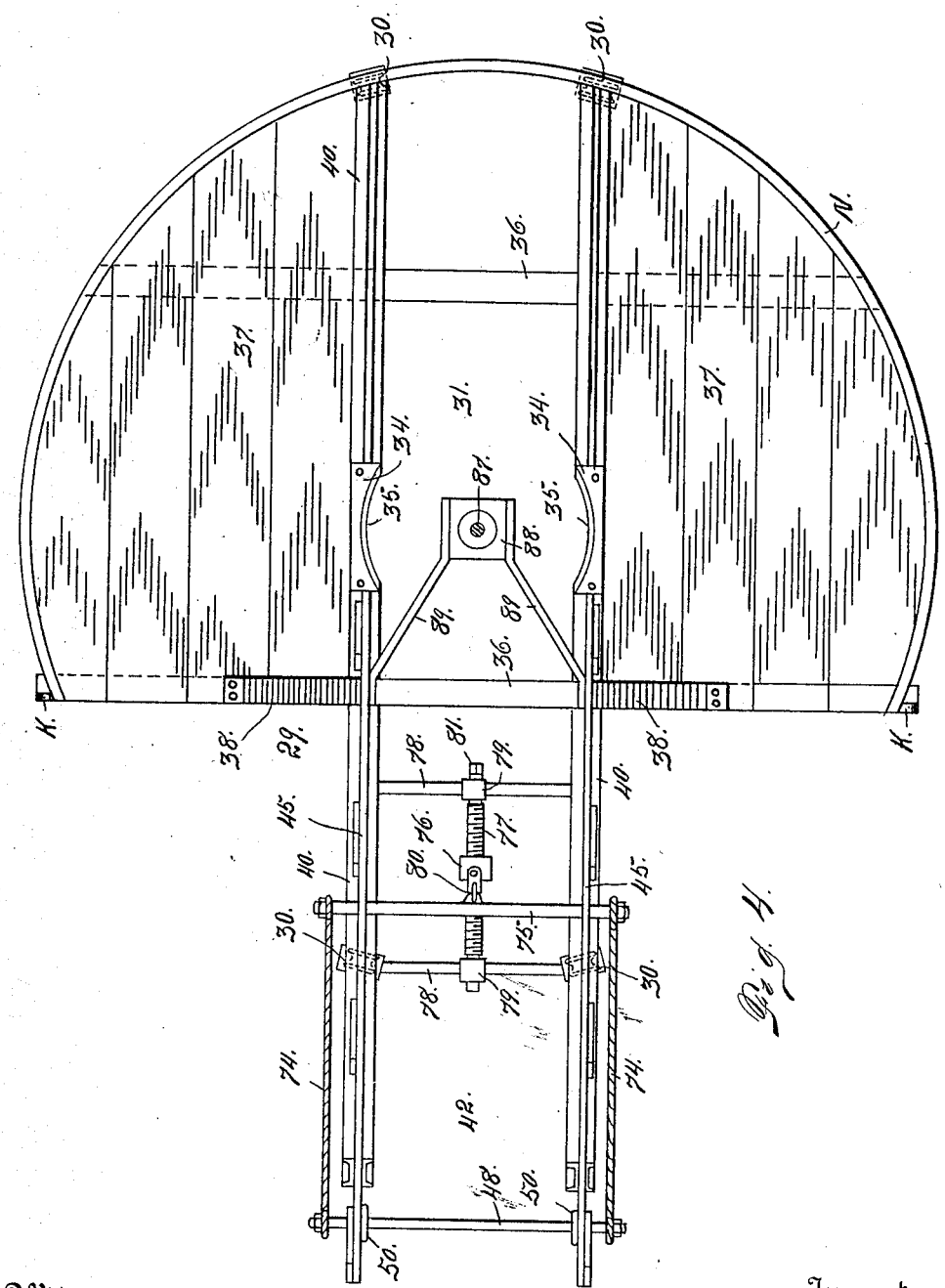

No. 892,829. PATENTED JULY 7, 1908.
W. M. GROSS.
STEAM SHOVEL.
APPLICATION FILED OCT. 8, 1907.
8 SHEETS—SHEET 5.
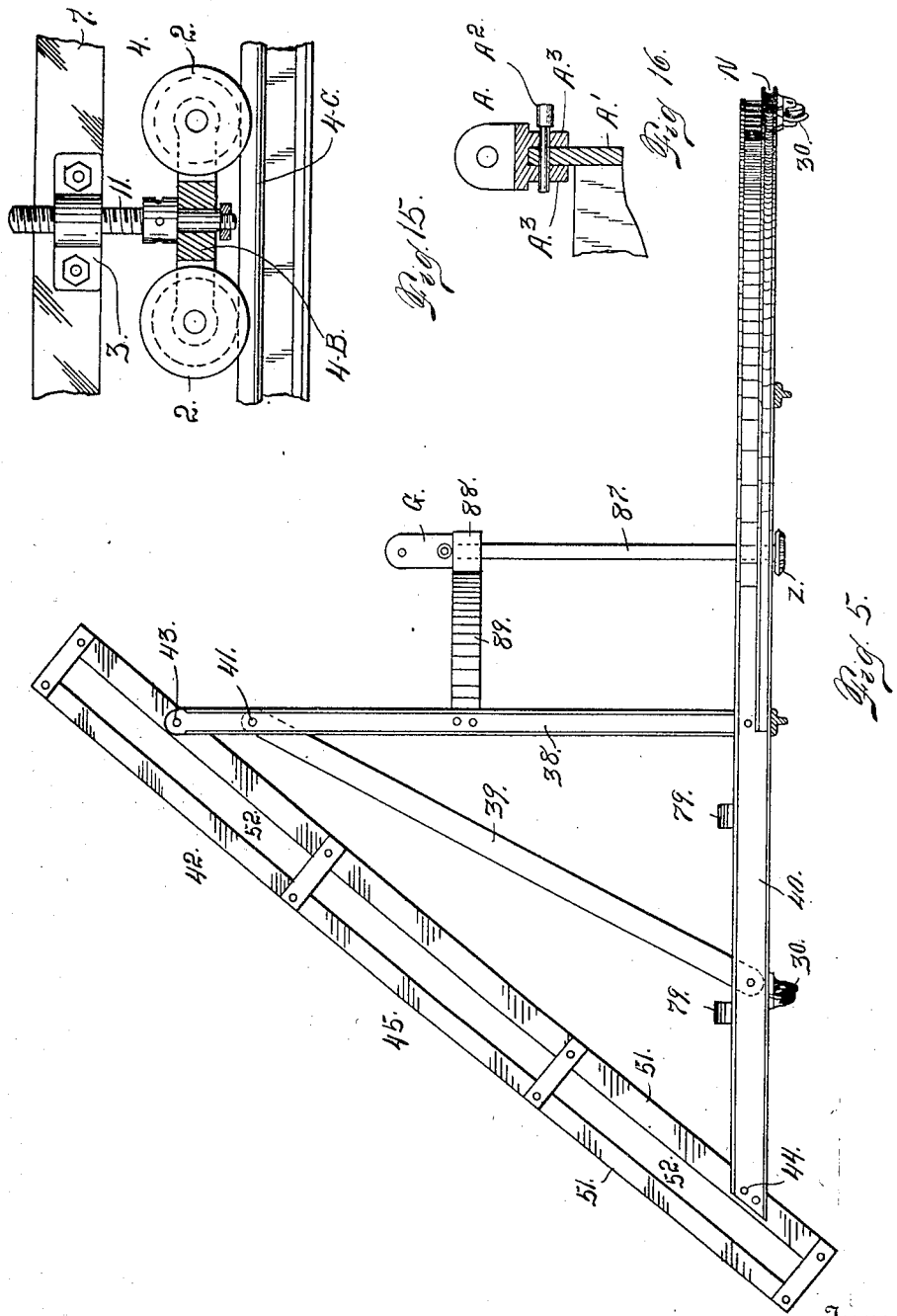

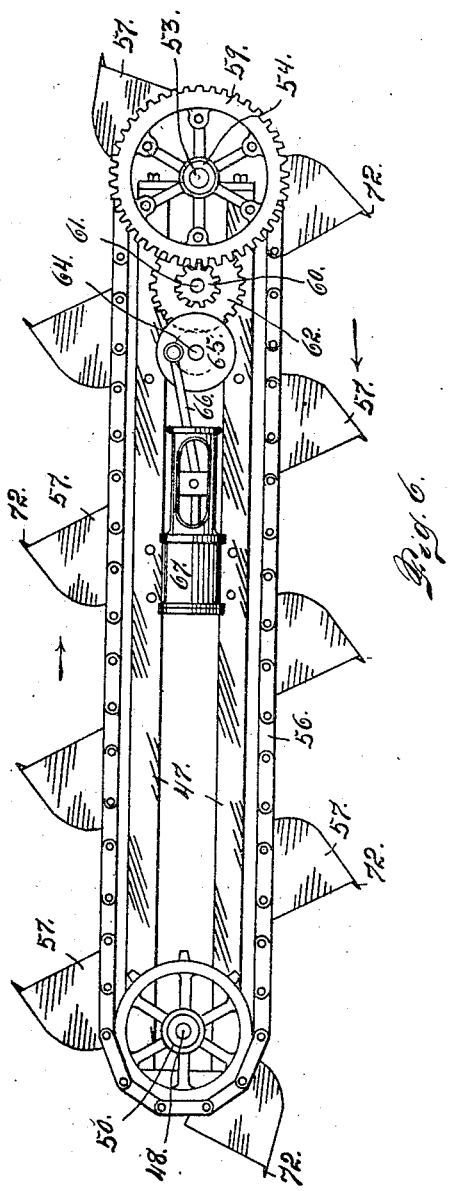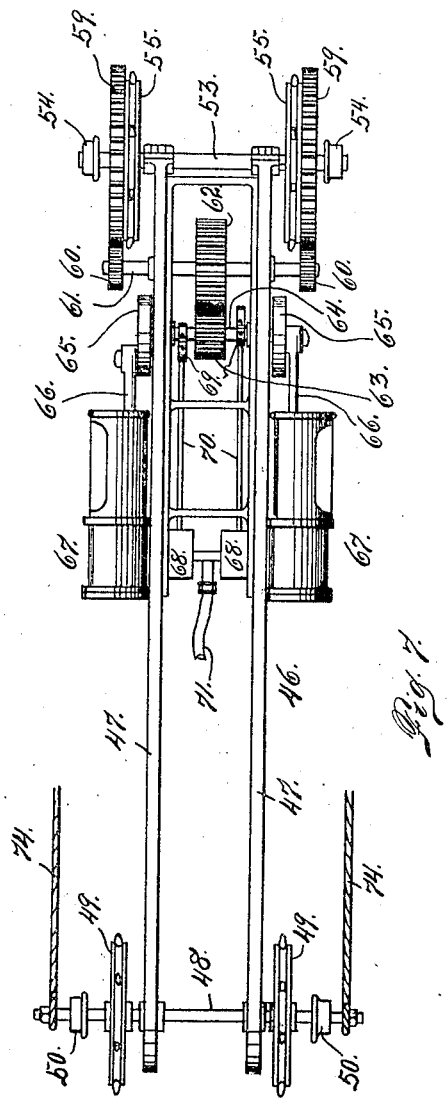

No. 892,829. PATENTED JULY 7, 1908.
W. M. GROSS.
STEAM SHOVEL.
APPLICATION FILED OCT. 8, 1907.

8 SHEETS—SHEET 7.

Witnesses
Otto E. Hoddick.
Dena Nelson.

Inventor
W. M. Gross.
By A. R. O'Brien
Attorney

No. 892,829. PATENTED JULY 7, 1908.
W. M. GROSS.
STEAM SHOVEL.
APPLICATION FILED OCT. 8, 1907.

8 SHEETS—SHEET 8.

Witnesses
Otto E. Hoddick
Dena Nelson

Inventor
W. M. Gross
By A. H. Comber
Attorney

UNITED STATES PATENT OFFICE.

WILLIAM M. GROSS, OF SALMON, IDAHO.

STEAM-SHOVEL.

No. 892,829.

Specification of Letters Patent.

Patented July 7, 1908.

Application filed October 8, 1907. Serial No. 396,451.

*To all whom it may concern:*

Be it known that I, WILLIAM M. GROSS, a citizen of the United States, residing at Salmon, in the county of Lemhi and State of Idaho, have invented certain new and useful Improvements in Steam-Shovels; and I do declare the following to be a full, clear, and exact description of the invention, such as will enable others skilled in the art to which it appertains to make and use the same, reference being had to the acompanying drawings, and to the letters and figures of reference marked thereon, which form a part of this specification.

My invention relates to improvements in steam shovels.

In my improved construction an endless bucket conveyer is mounted on a conveyer frame and this frame is in turn slidably mounted upon a relatively stationary frame, whereby the bucket conveyer frame is adapted to move longitudinally on the relatively stationary or auxiliary frame, to allow a bucket or shovel to pass an obstruction as a large rock or boulder, without injuring the bucket or other parts of the apparatus. Upon the conveyer frame is mounted an engine for propelling the endless bucket conveyer. The relatively stationary frame is mounted upon a rotary platform, the latter being in turn mounted upon a non-rotary platform which is, however, mounted to travel longitudinally upon a suitable track. Mounted on the non-rotary platform is an engine and a belt conveyer, the latter being so arranged as to receive the material discharged from the buckets of the bucket conveyer. This belt conveyer is pivotally mounted at its receiving extremity and is connected with means whereby its opposite extremities may be raised or lowered as may be desired depending on whether it is necessary to elevate the material after it leaves the bucket conveyer or carry it downwardly.

My improved mechanism is equipped with all necessary devices to provide a thoroughly practicable construction of the class indicated.

Having briefly outlined my improved construction, I will proceed to describe the same in detail reference being made to the accompanying drawing in which is illustrated an embodiment thereof.

Figure 2:
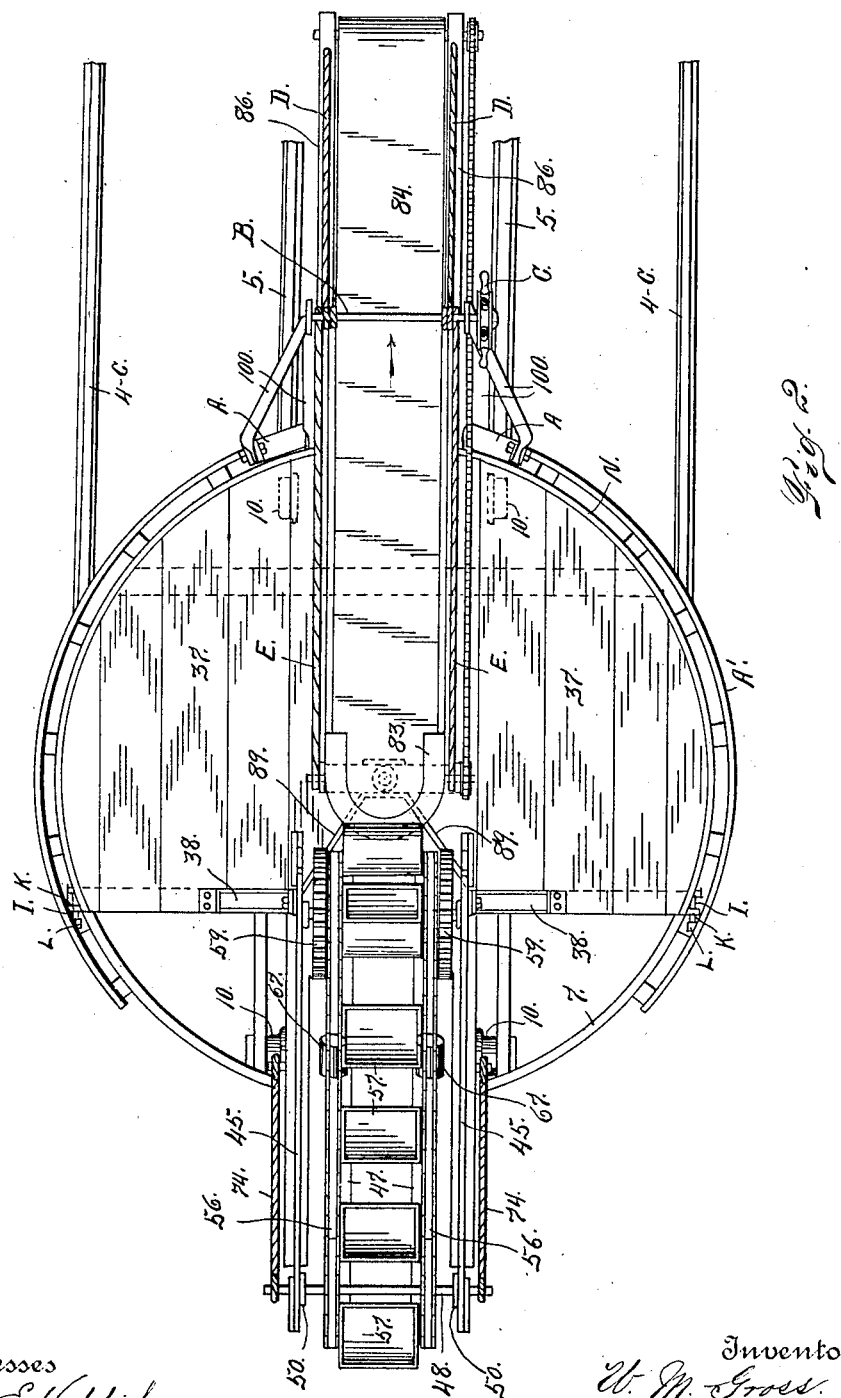
Figure 3:
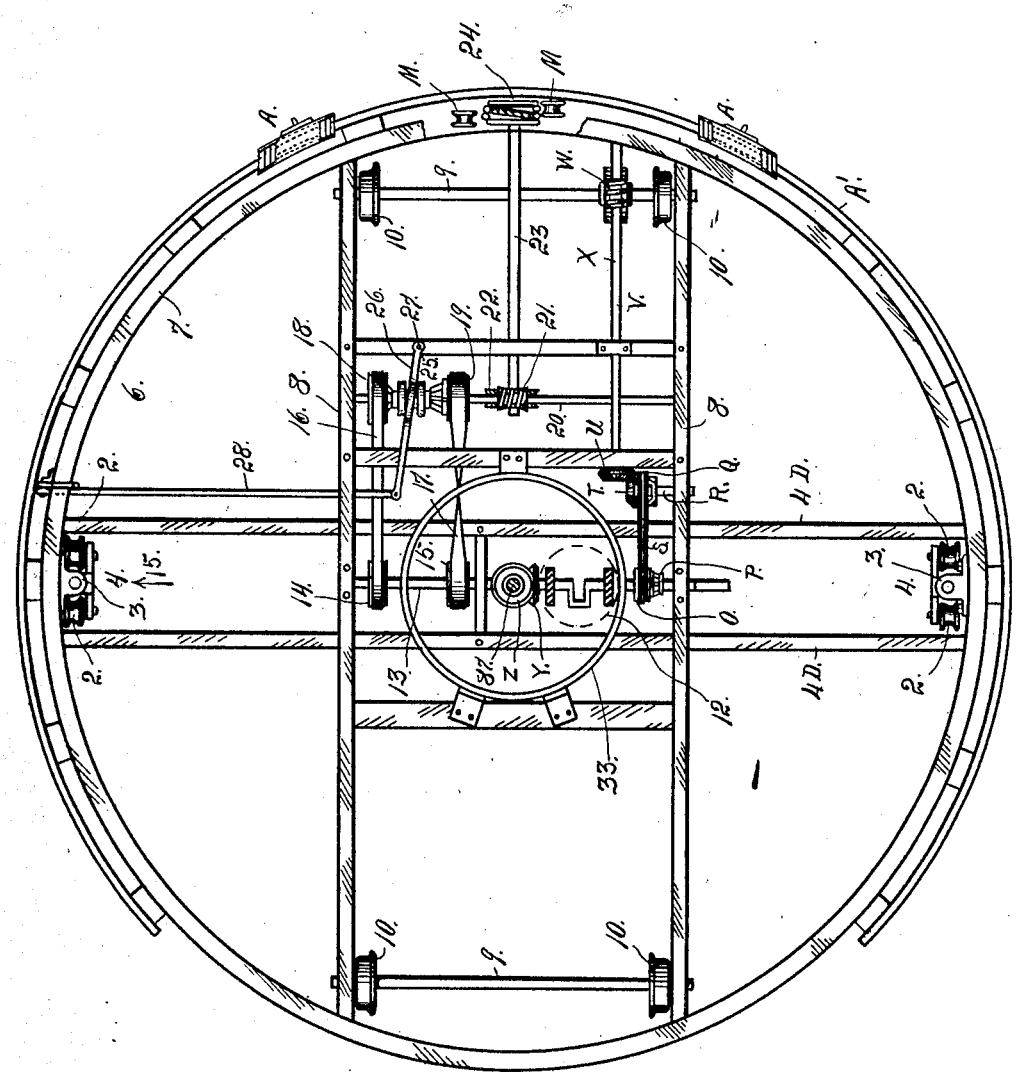
Figure 8:
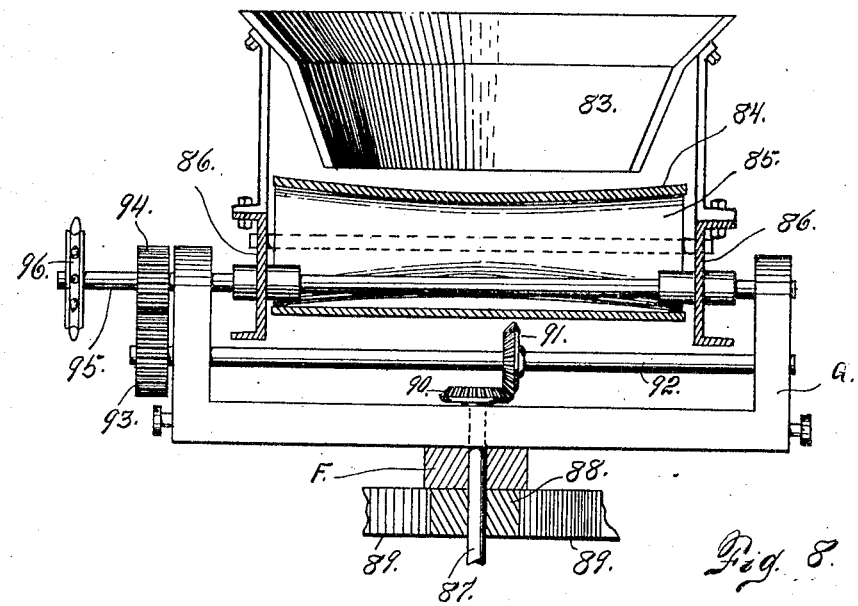
Figure 9:
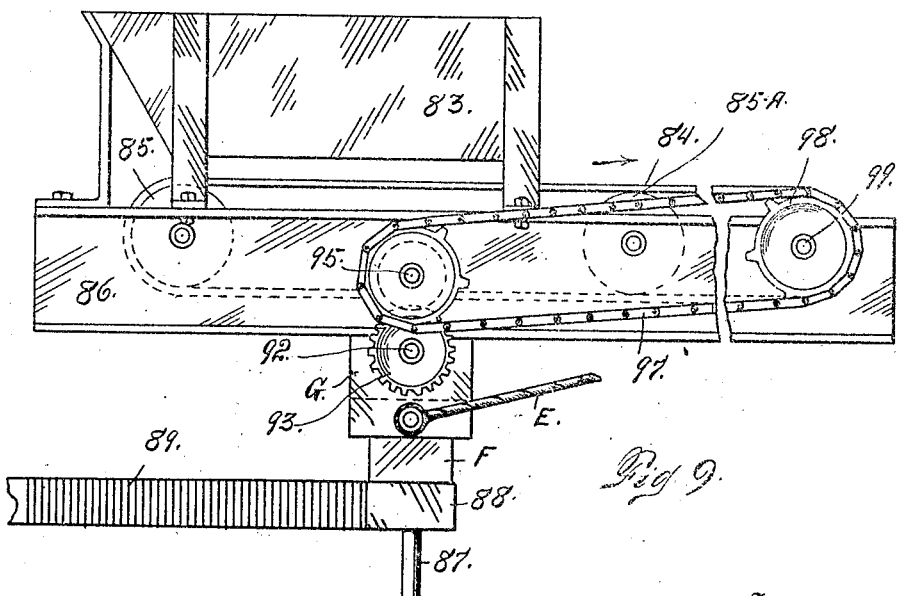
Figure 10:
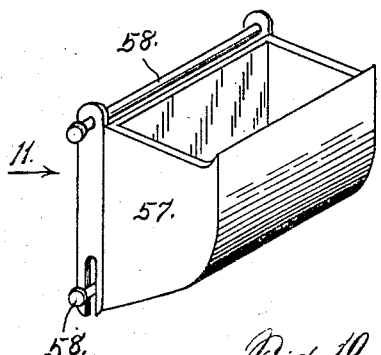
Figure 11:
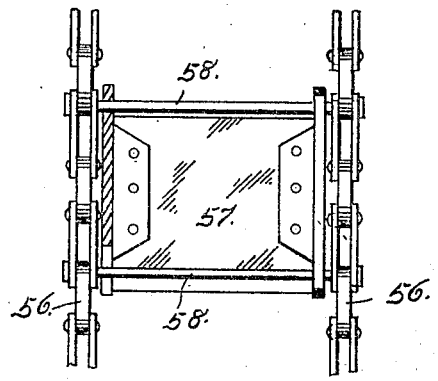
Figure 12:
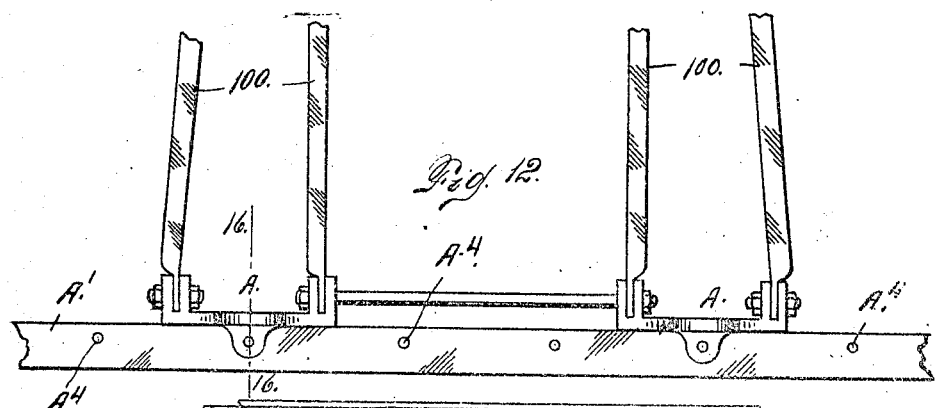
Figure 13:
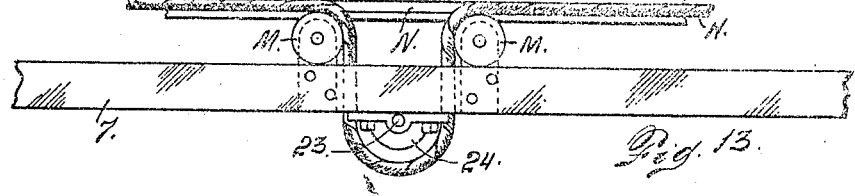
Figure 14:
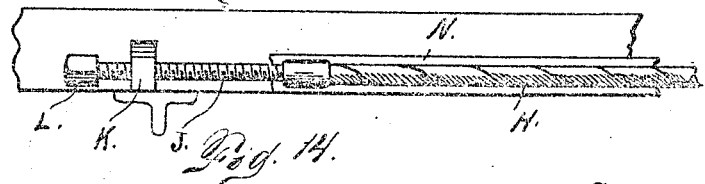

In this drawing, Figure 1 is a side elevation of my improved apparatus. Fig. 2 is a top plan view of the same. Fig. 3 is a top plan view of the non-rotary platform with the superstructure removed. Fig. 4 is a similar view showing the rotary platform in detail. Fig. 5 is a side elevation of the rotary platform equipped with a relatively stationary frame work. In this view the bucket conveyer, as well as the non-rotary platform is omitted. Fig. 6 is a side elevation of the bucket conveyer and the movable frame upon which it is mounted. In this view the stationary frame is omitted, and the parts are shown on a larger scale. Fig. 7 is a top plan view of the same. Fig. 8 is a section taken on the line 8—8 Fig. 1 viewed in the direction of the arrow and with the parts shown on a larger scale. Fig. 9 is a side elevation of the same with the belt conveyer mechanism, however, broken between its extremities for lack of room on the sheet. Fig. 10 is a perspective view in detail of one of the buckets or shovels. Fig. 11 is a fragmentary view of the bucket conveyer looking at the bucket in the direction of arrow 11 Fig. 10. In this view the parts are shown on a larger scale. Fig. 12 is a fragmentary view of the non-rotary platform looking in the direction of arrow 12 Fig. 1, the upright bars being partly broken away and the parts shown on an enlarged scale. Fig. 13 is a fragmentary edge view of the rotary and non-rotary platforms illustrating the travel of the operating cable which actuates the rotary platform element. Fig. 14 is an enlarged detail view of the cable mechanism for supporting the endless bucket conveyer frame upon the relatively stationary frame. Fig. 15 is an enlarged view of the laterally disposed vertically adjustable track wheels mounted on the non-rotary platform shown on a larger scale This is a view looking in the direction of arrow 15 Fig. 3. Fig. 16 is a section taken on the line 16—16, Fig. 12.

The same reference characters indicate the same parts in all the views.

Let the numeral 5 designate a track upon which is mounted a non-rotary platform 6 provided with a circular track 7. This stationary platform is provided with centrally located parallel frame bars 8 in which are journaled axles 9 provided with wheels 10 which engage the track 5 whereby the entire apparatus may be moved forward and back or longitudinally on the track. Mounted on this stationary platform is an engine 12 indicated by dotted lines in Fig. 3. In this last named figure the dotted circle is only intended to indicate the location of the engine. This engine actuates an operating shaft 13 provided with pulleys 14 and 15 from which lead belts 16 and 17 respectively, to pulleys 18 and 19 respectively, mounted on a shaft 20 provided with a worm 21 engaging a worm wheel 22 fast on a shaft 23, carrying at its outer extremity a grooved pulley 24. The pulleys 18 and 19 are normally loose on the worm shaft. Between these pulleys is located clutch mechanism 25 adapted to be shifted by a lever arm 26 fulcrumed at 27 and connected at its opposite extremity with an operating rod 28. When this clutch mechanism is shifted toward the pulley 18 as far as it will go, the last named pulley is locked on the worm shaft 20 and the latter will then be turned in one direction assuming that the operating shaft 13 is rotating. This movement will impart rotary movement to the worm wheel shaft 23 by virtue of the worm gear 21, 22, whereby the grooved pulley 24 is given a corresponding movement. Now if it is desired to reverse the movement of the grooved pulley 24, the clutch mechanism is shifted to its limit of movement in the opposite direction or toward the pulley 19 whereby the latter is locked on the worm shaft leaving the pulley 18 loose thereon. This will result in reversing the direction of the worm shaft's rotation since the belt 17 is a crossed belt. It is also evident that rotary movement will be imparted in the reverse direction to the shaft 23 and the grooved pulley 24. The function of the mechanism just described is to move the rotary platform hereinafter described in the one direction or the other as may be desired.

Mounted on the non-rotary platform 6, is the rotary platform 29 provided with track wheels 30, engaging the circular track 7 of the non-rotary platform. The right hand portion of this platform has the shape of a segment of a circle somewhat larger than a half circle. The central portion of the platform is open as shown at 31 and into it protrudes a circular bearing 33 engaged by blocks 34 mounted on the rotary platform and having their inner surfaces 35 curved to conform to the curve of the outer wall of the bearing 33. As shown in the drawing the segmental part of the rotary platform (see Fig. 4) is provided with transverse beams 36, while on opposite sides of the opening 31, the platform is closed as shown at 37. Mounted on the forward or left hand extremity of the rotary platform (see Fig. 4), and occupying positions directly above the cross beam 36, are two inclined upwardly projecting stationary bars 38. These bars 38 are braced by two bars 39 whose lower extremities are connected with the forwardly projecting centrally located parallel beams 40, while their upper extremities are connected with the upper portions of the bars 38 as shown at 41.

To the upper extremities of the bars 38 is secured an inclined relatively stationary frame work 42. This frame work is connected with the bars 38 as shown at 43. The lower and forward portion of the inclined frame work 42 is connected with the forward extremities of the platform beams 40 as shown at 44. The construction just described is best illustrated in Fig. 5 of the drawing. This frame work 42 is composed of two separated parallel members 45 and between these members, is located a conveyer frame 46 composed of two parallel members 47. Mounted in the lower extremities of the frame bars 47 is a stationary shaft 48 upon which are loosely mounted two sprocket wheels 49. Also loosely mounted upon the shaft 48 are two track wheels 50 adapted to pass between the two members 51 of each parallel side member 45 of the frame 42. Between these members 51 is a narrow space 52 of sufficient size to receive the track wheels 50, whereby the conveyer frame is permitted to slide or roll longitudinally upon the relatively stationary frame. Also fast to the upper extremities of the conveyer frame bars 47 is a shaft 53 provided with track wheels 54 similar to track wheels 50, the same being loose on the shaft 53 and engaging the space 52 between the members 51 of the relatively stationary frame as heretofore explained. Loose on the shaft 53 are two sprockets 55 in alinement with the two sprockets 49 on the shaft 48. Upon these four sprockets 49, 49 and 55, 55, are mounted the endless chains 56 carrying the buckets or shovels 57 which are connected with the chains at suitable intervals by means of rods 58 connected with each bucket and also forming hinge pins for the chains where the buckets are located.

The two sprocket wheels 55 are made fast to two gears 59 journaled on the stationary shaft 53 and meshing with pinions 60 fast on a shaft 61 journaled in the frame 46. Fast on the central portion of the shaft 61 is a gear 62 meshing with a smaller gear 63 fast on the engine shaft 64 provided with crank wheels 65 with which the piston stems 66 of the cylinders are connected. These cylinders are mounted on the members 47 of the conveyer frame 46 and receive their steam or operating fluid from steam chests 68 whose slide valves are regulated from eccentrics 69 mounted on the engine shaft, the eccentrics being connected with the valves of the steam chests by rods 70. The steam chests receive their supply of operating fluid through a conduit 71. When the operating fluid is turned on, it is evident that the bucket conveyer will be operated by virtue of the connections between the engine shaft and the sprocket wheels 55 as heretofore explained. The endless conveyer travels in the direction indicated by the arrows in Fig. 6. As the buckets or shovels 57 are moving downwardly upon the lower run of the conveyer, their open mouths are also downwardly directed and at the lower extremities of these mouths is a sharp edge or lip 72 adapted to dig into the bank 73, whereby the bucket or shovel is filled as it passes to the upper run of the conveyer.

The conveyer frame 46 is supported at a predetermined elevation upon the relatively stationary frame 42, by means of cables 74 connected at one extremity with the shaft 48 and at their opposite extremities with a bar 75. The central portion of the bar 75 is connected with a nut 76 threaded on a screw shaft 77 journaled in boxes 79 mounted on transverse members 78 fast on the beams 40 of the rotary platform, forward of the segmental member thereof. The connection between the bar 75 and the nut 76 is indicated at 80. The extremity 81 of the screw shaft 77 is shaped to receive a crank whereby the said shaft may be rotated for the purpose of causing the nut 76 to travel forward or backward thereon whereby the bucket conveyer frame may be raised or lowered. If the bar 75 which is slidably mounted on the beams 40, is caused to travel rearwardly or toward the right in Fig. 4, the conveyer frame may be moved upwardly a limited distance on the relatively stationary frame 42; while if the shaft 77 is turned in the opposite direction, the conveyer frame will be allowed to slide downwardly upon the frame 42.

If in the operation of the machine a bucket 57, strikes a boulder or large rock 82, the conveyer with its frame will move upwardly, to allow the bucket to pass over the said boulder after which the conveyer will automatically return to its normal position on the opposite side of the boulder. By virtue of this construction the material will be dug away on both sides of the boulder until the latter is loosened and if it is too large to be taken up by a bucket, it may be removed in any suitable manner. If it were not for this feature whereby the conveyer is allowed to automatically adjust itself upon the relatively stationary frame 42, the conveyer might be broken by one of its buckets coming in contact with a large rock or boulder such as is indicated at 82 in the drawing. Mounted to receive the contents of the buckets 57 as they assume the dumping position at the upper extremity of the conveyer, is a bottomless hopper 83 mounted above the forward extremity of an endless conveyer belt 84 mounted on end drums 85 journaled in channel beams 86 which constitute the frame work of the belt conveyer. The drums 84 are largest at their outer extremities and taper or diminish in size toward the center, whereby the upper run of the belt is caused to assume such a position that it is lowest at its longitudinal center and highest at its outer edges whereby it is adapted to hold a considerable quantity of material without the use of flanges at its outer edges.

The belt conveyer is operated from the engine 12 which rotates a vertically disposed shaft 87 its upper portion being journaled in a bearing 88 connected with the upright bars 38 by rearwardly extending bars 89. To the upper extremity of the shaft 87 is made fast a beveled gear 90 meshing with a similar gear 91 fast on a transverse shaft 92 one extremity of which is provided with a gear 93 meshing with a gear 94 fast on a shaft 95 to one extremity of which is made fast a sprocket wheel 96 connected by means of a chain 97 with a sprocket 98 fast on the journal 99 of the rearwardly located drum 84. As the belt conveyer is intended to travel in the direction indicated by the arrow in Figs. 1, 2 and 9, the construction described for operating the same results in a pulling movement acting from the extremity farthest away from the power, the pull being on the upper run of the belt conveyer which is believed preferable.

The forward extremities of the frame bars 86, are pivotally mounted upon the shaft 95. The opposite extremity of the conveyer frame is supported by upwardly projecting bars 100 whose lower extremities are movably connected with brackets A adjustably mounted on the outer member A' of the non-rotary platform. Journaled on the upper extremities of these bars 100, is a winding shaft B provided at one extremity with a hand wheel C. The forward extremities of two cables D are connected with this shaft while their rear extremities are attached to the rearward extremities of the beams 86. The bars 100 are further supported by guy ropes or cables E connected at their forward extremities with a U-shaped member G supported by the bearing 88. By turning the winding shaft B in the proper direction, the rear extremity of the belt conveyer frame may be raised or lowered as may be desired whereby the material received from the bucket conveyer may be elevated or not as desired. Attention is called to the fact that the shaft 95 is journaled in the U-shaped transversely arranged member G resting on a block F and supported by the bearing 88 and the frame bars 89.

The rotary platform is actuated by means of a cable H connected at its opposite extremities with the said platform on two opposite sides as shown at I (see Fig. 2). As shown in the drawing each extremity of the cable (see Fig. 14) is equipped with a screw J threaded in a nut K fast on the rotary platform. Each screw is fashioned at one extremity as shown at L to receive a crank or wrench for purposes of adjustment whereby the tension of the cable is properly regulated. This cable at the rear extremity of the non-rotary platform, passes downwardly over guide pulleys M and under and around the grooved pulley 24 fast on the worm wheel shaft 23 as heretofore explained. The said cable engages a grooved track N formed on the periphery of the rotary platform (see Figs. 5 and 14). If it is desired to rotate the rotary platform in one direction, a corresponding rotary movement is imparted to the shaft 23; while if it is desired to move it in the opposite direction, the shaft 23 is rotated in the opposite direction as will be readily understood.

When it is desired to move the entire structure forwardly or rearwardly upon the track 5, a pulley O normally loose on the engine shaft 13, is caused to rotate with said shaft by means of a clutch P adapted to be adjusted on the shaft for the purpose. At the same time the clutch 25 heretofore explained is adjusted to occupy a central position whereby both pulleys 18 and 19 will be loose upon the worm shaft 20, allowing the engine shaft 13 to rotate without operating the shaft 20 and its connections. Leading from the pulley O to a similar pulley Q fast on a shaft R is a belt S. Also fast on the shaft R is a beveled gear T which meshes with a similar gear U fast on a shaft V having a worm W which engages a worm wheel X fast on one of the axles 9 upon which the wheels 10 of the non-rotary platform are made fast.

From the foregoing description the use and operation of my improved construction will be readily understood. It is evident that if the engine shaft 13 be set in motion under the circumstances just explained, that the non-rotary platform together with the entire superstructure may be moved forwardly or rearwardly upon the track 5 as may be desired. This of course will be done by means of reversing the engine whereby the shaft 13 may be made to rotate in opposite directions. Now when it is desired to turn the rotary platform in either direction whereby the bucket conveyer may be caused to change its position to act upon a bank located at any desired angle within reasonable limits, with the direction of the track 5, the clutch P will of course be first shifted to allow the shaft 13 to rotate therein or whereby the pulley O is made loose on the shaft. The clutch mechanism 25 will then be shifted to cause one of the pulleys 18 or 19 to be locked upon the shaft 20, whereby the latter may be rotated in the one direction or the other as may be desired. The rotation of the shaft 20 will also operate the shaft 23 by virtue of the worm gear connection heretofore explained.

The rotation of the shaft 23, operates the grooved pulley 24, whereby the cable is caused to move in the one direction or the other as may be desired, thus causing the rotary platform to move in a corresponding direction by virtue of the frictional engagement between the cable and the track N of the said platform. Now after the apparatus has been adjusted by moving it forwardly or rearwardly bodily upon the track 5 to bring it into proper relation with the bank of material to be acted upon, the clutch mechanism 25 is adjusted to occupy a central position whereby the pulleys 18 and 19 are loose upon the shaft 20, allowing the engine shaft 13 to rotate without operating any of the mechanism connected with the said shaft except the vertically disposed shaft 87. There is a beveled gear Y fast on the shaft 13 which meshes with a similar beveled gear Z fast on the lower extremity of the shaft 87, whereby motion is communicated from the shaft 13 to the shaft 87. From what has been heretofore explained, it will be understood that the operation of the shaft 87, imparts movement to the belt conveyer 84 in the direction indicated by the arrows as heretofore explained. Simultaneously with the operation of the belt conveyer, the bucket conveyer is operated, by delivering operating fluid to the cylinders 67 mounted on the conveyer frame 46, and whereby motion is communicated to the endless bucket conveyer through the medium of the mechanism heretofore explained. During the operation of the belt conveyer, the buckets dig into the bank 73 as they reach the lower extremity of the conveyer frame, whereby the buckets are filled and carried upwardly and discharged into the hopper 83. As this hopper is open at the bottom, the material falls directly to the centrally depressed belt conveyer 84 and is carried rearwardly thereby and discharged at a lower or more elevated point as may be desired.

Attention is called to the fact that the brackets A are removably mounted upon the non-rotary platform and may be changed to any desired position thereon according to the direction it is desired to carry the material discharged upon the belt conveyer in any desired direction. It may be stated that the U-shaped member G which really forms the support for the forward extremity of the conveyer frame, may turn freely upon the vertical engine shaft 87 in a horizontal plane, thus allowing the lateral adjustability of the belt conveyer, which becomes practicable by reason of the fact that the axis of the shaft 87 coincides with the axis or center of motion of the rotary platform. Hence the rotary platform may be actuated without changing the position of the belt conveyer, and at the same time allow the discharge from the bucket conveyer to enter the hopper 83. It is also true that the lateral position of the belt conveyer may be changed without interfering in any way with the operative arrangement of the two conveyers. The endless traveling belt conveyer, is supported intermediate the end drums by transversely disposed rollers 85ᴬ which engage the upper run of the conveyer.

The non-rotary platform 6 is provided on opposite sides of the parallel frame bars 8 with roller devices 4 comprising brackets 3 and grooved rollers or track wheels 2. These brackets are attached to the inner periphery of the circular track 7 by means of a jack screw 11 journaled in each bracket 4 and threaded in a nut 4ᴬ attached to the track 7. The function of these laterally disposed track wheels, is to facilitate the proper support of the non-rotary platform where the diameter of the said platform is considerable. In this event temporary tracks are located underneath these wheels, and the vertical position of the latter is regulated to harmonize with the varying conditions of the surface. A hand spike or other suitable tool (not shown) may be inserted in openings 4ᴮ formed in the collar of the screw, for the purpose of turning the latter in either direction according as it is necessary to raise or lower the wheels in order to bring them into proper engagement with the temporary tracks 4ᶜ.

In order to properly strengthen the non-rotary platform, where the latter is of considerable size, transversely disposed beams or channel bars 4ᴰ (see Fig. 3) may be employed. These channel bars are located on opposite sides of a diameter passed through the center of the platform and the track wheel devices 4 occupy positions between these beams.

My improved machine is especially adapted for use in excavating earthen material of all kinds and loading the same upon wagons, carts or cars or removing it from a ditch and placing it upon a bank either to the right or left or straight back over the machine for a considerable distance say from ten to fifty feet. It is also particularly advantageous in forming railroad cuts and also in street grading. It may also be employed in various other relations of a like or similar character.

In order to change the position of the brackets A upon the non-rotary platform, it is only necessary to remove the pin A² which passes through registering openings formed in lugs A³ and the member A' which these lugs straddle. When this is done the brackets may be made to slide along the top of the non-rotary platform member A' until the desired position is reached. In order to lock the brackets in any desired position, additional apertures A⁴ are formed in the member A'.

Having thus described my invention, what I claim is:

1. In a mechanism of the class described, the combination with a suitable support, of a conveyer whose frame is slidably mounted upon said support, a motor mounted on the conveyer frame, and a suitable connection between the motor and the conveyer, whereby the latter is adapted to automatically adjust itself vertically, substantially as described.

2. The combination with a relatively stationary frame, of an endless bucket conveyer, and a conveyer frame slidably mounted on the relatively stationary frame, an engine mounted on the conveyer frame, and a suitable operative connection between the engine and the endless bucket conveyer, substantially as described.

3. In a fluid operated shovel, the combination with a frame, of an endless bucket conveyer mounted thereon, an engine mounted on the conveyer frame, and a suitable operative connection between the endless conveyer and the said engine, substantially as described.

4. The combination with a relatively stationary frame, of a conveyer frame movably mounted thereon, an endless bucket conveyer mounted on the conveyer frame, an engine also mounted on the conveyer frame, and a suitable operative connection between the engine and the endless bucket conveyer, substantially as described.

5. The combination with a rotary platform, of a relatively stationary frame mounted thereon, a conveyer frame longitudinally movable on the relatively stationary frame, an endless bucket conveyer mounted on the conveyer frame, an engine also mounted on the conveyer frame, and a suitable operative connection between the engine and the endless bucket conveyer, substantially as described.

6. The combination with a rotary platform, of a relatively stationary frame mounted thereon and rigidly connected therewith, a conveyer frame longitudinally movable upon the relatively stationary frame, a screw shaft journaled on the rotary platform, a nut threaded to travel on said shaft, and a cable connection between the nut and conveyer frame whereby the longitudinal position of the latter upon the stationary frame may be regulated and controlled.

7. The combination with a non-rotary platform, of an upper platform rotatably mounted thereon, an endless bucket conveyer mounted on the rotary platform, a portion of the rotary platform having the shape of a segment of a circle, the periphery of the said platform having a grooved track, an operating cable engaging said track, the extremities of the cable being adjustably connected with the platform for tension purposes, an operating wheel mounted in a different plane from the platform and engaged by the said cable intermediate its extremities, a fluid-operated engine mounted on the non-rotary platform, and a suitable operative connection between said engine and the wheel engaged by the cable whereby the said wheel may be rotated in the one direction or the other according to the direction it is desired to turn the platform.

8. The combination with a non-rotary platform, of an upper platform rotatably mounted on the non-rotary platform, an endless bucket conveyer mounted on the rotary platform, the rotary platform being circular in shape, its periphery being provided with a grooved track, a cable engaging said track and fastened at its extremities to the rotary platform, an operating wheel located out of the plane of the rotary platform and having its axis parallel with the rotary platform, a fluid-operated engine mounted on the non-rotary platform, an operative connection between the said engine and the said wheel, mechanism interposed between the engine and the wheel capable of such adjustment that the wheel may be turned in the one direction or the other without reversing the engine, substantially as described.

9. The combination with a non-rotary platform, and a track upon which said platform is mounted to travel, of a second platform rotatably mounted upon the non-rotary platform, an endless bucket conveyer mounted on the rotary platform, a cable engaging the periphery of the rotary platform and having its extremities secured to the latter, an operating wheel engaging said cable, a shaft upon which said wheel is mounted, an engine, an engine shaft, a countershaft, an operative connection between the engine shaft and countershaft to permit the rotation of the latter in reverse directions or allow it to remain stationary as may be desired, and a worm gear connection between the countershaft and the shaft upon which the cable operating wheel is mounted, substantially as described.

10. The combination with a non-rotary platform, a track upon which said platform is mounted to travel either forwardly or rearwardly, a second platform rotatably mounted upon the non-rotary platform, an endless bucket conveyer mounted on the rotary platform, an engine also mounted on the non-rotary platform, an operative connection between the engine and the rotary platform for imparting the rotary movement to the latter, and an operative connection between the same engine and the non-rotary platform, for imparting the forward and backward movement to the latter, substantially as described.

11. The combination with a platform, of an endless bucket conveyer, a conveyer frame upon which the latter is mounted, a second conveyer also mounted thereon, the two conveyers being in alinement with each other, means mounted on the platform for operating the second conveyer, and means mounted on the frame of the endless bucket conveyer for operating the latter, substantially as described.

12. The combination with a platform, of an endless bucket conveyer mounted thereon, a belt conveyer in alinement with the bucket conveyer, a support engaging the platform upon which one extremity of the frame of the belt conveyer is pivotally mounted, an upright support mounted on the platform and projecting above the belt conveyer intermediate its extremities, a winding shaft mounted on said support, and a cable connection between said winding shaft and the free extremity of the belt conveyer whereby the elevation of the latter may be adjusted, substantially as described.

13. The combination with a non-rotary platform, a track upon which said platform is mounted to travel forwardly and rearwardly, a second platform rotatably mounted upon the non-rotary platform, an endless bucket conveyer mounted on the rotary platform, and a second conveyer arranged in alinement with the endless bucket conveyer and arranged to receive the contents of the buckets as they move to the dumping position, substantially as described.

14. The combination with a track, of a non-rotary platform mounted to travel upon said track, a second platform rotatably mounted upon the non-rotary platform, an engine mounted on the non-rotary platform, a suitable connection between said engine and the last named platform, whereby the latter may be moved in either direction upon its track, a suitable operative connection between said engine and the rotary platform, whereby the latter may be rotated in either direction, an endless bucket conveyer mounted on the rotary platform, and a second conveyer mounted on the non-rotary platform and arranged to receive the discharge from the endless bucket conveyer, the second conveyer being mounted to permit lateral adjustment to change its line of direction substantially as described.

15. The combination of a non-rotary platform, a second platform rotatably mounted thereon, an endless bucket conveyer mounted on the rotary platform, and an endless belt conveyer mounted on the non-rotary platform, the belt conveyer being arranged to receive the discharge from the bucket conveyer regardless of the relative position of the rotary platform, the belt conveyer being mounted to permit vertical adjustment to regulate its inclination substantially as described.

16. The combination of a non-rotary platform, a track upon which said platform is mounted, a second platform rotatably mounted upon the non-rotary platform, an engine mounted on the non-rotary platform, an operative connection between the said engine and the rotary platform for actuating the latter, an operative connection between the engine and the non-rotary platform for moving the latter upon its track in either direction, an endless bucket conveyer mounted on the rotary platform, a frame upon which the said conveyer is mounted, an engine mounted on the said frame, an operative connection between the engine and the bucket conveyer, a belt conveyer mounted on the non-rotary platform and arranged to receive the discharge from the bucket conveyer regardless of the relative position of the rotary platform, and an operative connection between the belt conveyer and the engine carried by the non-rotary platform, substantially as described.

17. The combination of a non-rotary platform, a second platform rotatably mounted thereon, an endless bucket conveyer mounted on the rotary platform, and a second conveyer mounted on the non-rotary platform, the second conveyer being arranged to receive the discharge from the bucket conveyer, and mounted to permit vertical adjustment to regulate its inclination and also to permit lateral adjustment, substantially as described.

18. The combination with a non-rotary platform, a belt conveyer pivotally mounted at one extremity to permit vertical adjustment to regulate its inclination and also to permit lateral adjustment, a second platform rotatably mounted upon the non-rotary platform, its axis of rotation coinciding with the conveyer belt's axis of lateral movement, and an endless bucket conveyer mounted on the rotary platform and arranged to discharge upon the belt conveyer.

19. The combination with a non-rotary platform, a track upon which said platform is mounted to travel forwardly and rearwardly, the platform having centrally located track wheels, and laterally disposed vertically adjustable wheels, to preserve the balance of the platform, an endless bucket conveyer mounted on the rotary platform, and a second conveyer mounted on the non-rotary platform and coöperating with the first named conveyer, substantially as described.

In testimony whereof I affix my signature in presence of two witnesses.

WILLIAM M. GROSS.

Witnesses:
    DENA NELSON,
    MAY GAWLEY.